United States Patent
Chen et al.

(10) Patent No.: US 6,552,874 B1
(45) Date of Patent: Apr. 22, 2003

(54) SHARED POLE MAGNETIC READ-WRITE HEAD FOR ACHIEVING OPTIMIZED ERASE BAND WIDTH AND METHOD OF FABRICATING THE SAME

(75) Inventors: Wenjie Chen, Cupertino, CA (US); Renuka Apparao, Fremont, CA (US); Bill Crue, Pittsburgh, PA (US)

(73) Assignee: Read-Rite Corporation, Fremont, CA (US)

(*) Notice: Subject to any disclaimer, the term of this patent is extended or adjusted under 35 U.S.C. 154(b) by 0 days.

(21) Appl. No.: 09/574,577

(22) Filed: May 17, 2000

(51) Int. Cl.⁷ .......................... G11B 5/147; G11B 5/139
(52) U.S. Cl. .................................... 360/126; 360/317
(58) Field of Search ................................ 360/125, 126, 360/317

(56) References Cited

U.S. PATENT DOCUMENTS

| | | |
|---|---|---|
| 4,847,715 A | 7/1989 | Kumasaka et al. |
| 4,921,508 A | 5/1990 | Nonaka |
| 5,012,375 A | 4/1991 | Nishimura |
| 5,168,409 A | 12/1992 | Koyama et al. |
| 5,315,469 A | 5/1994 | McNeil |
| 5,479,696 A | 1/1996 | McNeil |
| 5,493,464 A | 2/1996 | Koshikawa |
| 5,493,466 A | 2/1996 | Suyama |
| 5,496,379 A | 3/1996 | Rippon et al. |
| 5,555,482 A | 9/1996 | McNeil |
| 5,571,526 A | 11/1996 | Miyata |
| 5,640,753 A | 6/1997 | Schultz et al. |
| 5,652,687 A | 7/1997 | Chen et al. |
| 5,668,686 A | 9/1997 | Shouji et al. |
| 5,719,730 A | 2/1998 | Chang et al. |
| 5,722,157 A | 3/1998 | Shouji et al. |
| 5,726,841 A | 3/1998 | Tong et al. |
| 5,745,980 A | 5/1998 | Cohen |
| 5,749,991 A | 5/1998 | Aberg |
| 5,774,308 A | 6/1998 | Ohtsuka et al. |
| 5,779,923 A | 7/1998 | Krounbi et al. |
| 5,793,578 A | 8/1998 | Heim et al. |
| 5,793,579 A | 8/1998 | Yamamoto et al. |
| 5,802,700 A | 9/1998 | Chen et al. |
| 5,809,636 A | 9/1998 | Shouji et al. |
| 5,809,637 A | 9/1998 | Rottmayer |
| 5,875,542 A | 3/1999 | Tran et al. |
| 5,880,915 A | 3/1999 | Lee et al. |
| 6,069,775 A * | 5/2000 | Chang et al. ............... 360/126 |
| 6,141,183 A * | 10/2000 | Wu et al. ................... 360/126 |
| 2002/0006018 A1 * | 1/2002 | Narumi et al. .............. 360/317 |

* cited by examiner

*Primary Examiner*—George J. Letscher
(74) *Attorney, Agent, or Firm*—Carr & Ferrell LLP

(57) ABSTRACT

The present invention provides a shared pole magnetic read/write head for achieving optimized erase band width and a method for fabricating same. It has been found that there exists a relationship between a quantity delta defined as the difference between the width of the first pole and the width of the second pole and the resultant erase band width. The method of the present invention optimizes the erase band width by adjusting the value of delta and results in a read/write head useful in circumstances where the servo does not require small erase bands such as those resulting from a self-aligned pole structure having equal widths. Additionally, the alignment of the second pole relative to the first pole is not of critical importance in the read/write head of the present invention, the first pole being wider than the second pole.

2 Claims, 14 Drawing Sheets

STEP 1> PROCESS P1 DEFINED WAFERS UP TO 1ST CMP

STEP 2> PLATE PL1 AND APPLY 2ND CMP

STEP 4> PROCESS INSULATION STACK AND POLE 2

STEP 1> PROCESS P2 DEFINED WAFERS UP TO P2 ETCH (CMP PLANARIZE S2/P1)

STEP 2> MASK P2 MILL RESIST

STEP 3> ION MILL TO DEFINE TRACKWIDTH

US 6,552,874 B1

SHARED POLE MAGNETIC READ-WRITE HEAD FOR ACHIEVING OPTIMIZED ERASE BAND WIDTH AND METHOD OF FABRICATING THE SAME

BACKGROUND OF THE INVENTION

This invention relates generally to magnetic write transducers, and more particularly to magnetic write transducers for achieving optimized erase band widths and methods of fabricating the same.

Magnetic disk drives are used to store and retrieve data for digital electronic apparatus such as computers. In FIGS. 1A and 1B, a magnetic disk data storage system 10 of the prior art includes a sealed enclosure 12, a disk drive motor 14, a magnetic disk 16 supported for rotation by a drive spindle Si of motor 14, an actuator 18 and an arm 20 attached to an actuator spindle S2 of actuator 18. A suspension 22 is coupled at one end to the arm 20, and at its other end to a read/write head or transducer 24. The transducer 24 (which will be described in greater detail with reference to FIG. 2A) typically includes an inductive write element with a sensor read element. As the motor 14 rotates the magnetic disk 16, as indicated by the arrow R, an air bearing is formed under the transducer 24 causing it to lift slightly off of the surface of the magnetic disk 16, or, as it is termed in the art, to "fly" above the magnetic disk 16. Alternatively, some transducers, known as "contact heads", ride on the disk surface. Various magnetic "tracks" of information can be written to and/or read from the magnetic disk 16 as the actuator 18 causes the transducer 24 to pivot in a short arc as indicated by the arrows P. The design and manufacture of magnetic disk data storage systems is well known to those skilled in the art.

FIG. 2A depicts a magnetic read/write head 24 including a substrate 25 above which a read element 26 and a write element 28 are disposed. Edges of the read element 26 and write element 28 also define an air bearing surface (ABS), in a plane 29, which can be aligned to face the surface of the magnetic disk 16 (see FIGS. 1A and 1B). The read element 26 includes a first shield 30, an intermediate layer 32 which functions as a second shield, and a read sensor 34 that is located within a dielectric medium 35 between the first shield 30 and the second shield 32. The most common type of read sensor 34 used in the read/write head 24 is the magnetoresistive (AMR or GMR) sensor, which is used to detect magnetic field signals from a magnetic medium through changing resistance in the read sensor.

The write element 28 is typically an inductive write element which includes the intermediate layer 32, which functions as a first pole, and a second pole 38 disposed above the first pole 32. The first pole 32 and the second pole 38 are attached to each other in a backgap region (not shown), with these three elements collectively forming a yoke generally designated 41. The combination of a first pole tip portion 43 and a second pole tip portion 45 near the ABS are sometimes referred to as the yoke tip portion 46. The write gap 36 is filled with a non-magnetic, electrically insulating material that forms a write gap material layer 37. This non-magnetic material can be either integral with (as is shown here) or separate from a first insulation layer 47 that lies below the second pole 38 and extends from the yoke tip portion 46 to the backgap region.

Also included in write element 28 is a conductive coil generally designated 48, formed of multiple windings 49. The conductive coil 48 is positioned within a coil insulation layer 50 that lies above the first insulation layer 47. The first insulation layer 47 thereby electrically insulates the windings 49 from each other and from the second pole 38.

An inductive write head such as that shown in FIG. 2A operates by passing a writing current through the conductive coil layer 48. Due to the magnetic properties of the yoke 41, a magnetic flux is induced in the first and second poles 32 and 38 by write currents passed through the coil layer 48. A magnetic field formed at the write gap 36 allows the magnetic flux to cross a magnetic recording medium that is placed near the ABS.

A critical parameter of a magnetic write element is the magnetic write width or trackwidth of the write element which defines track density. Generally, a narrower trackwidth results in a higher magnetic recording density. The trackwidth is defined by the geometries in the yoke tip portion 46 at the ABS. These geominetries can be better understood with reference to FIG. 10. As can be seen from this view, the first pole 72 and the second pole tip portion 79 can have different widths W1 and W2 respectively in the yoke tip portion 46 (see FIG. 2A). In the shown configuration, the trackwidth of the write element 28 is defined by the width of the second pole tip portion 79 at the ABS.

When a track of information is written on the magnetic medium, the magnetic write width is determined by the width of the magnetic flux generated at the gap 36 (the "write bubble") which in turn is determined by the strength of the field between the poles of the write element. To achieve rotation of the transitions in the media, the field strength of the write bubble between the poles must correspond to the coercivity of the media. A field having such strength is schematically represented as a dashed flux line 56 in FIG. 3. In fringe areas of the write bubble, such as those designated at 58, a fringing field may be of insufficient strength to rotate the transitions, and partial rotation may be achieved resulting in re-magnetization of the medium close to the track edges. It has been found that at both sides of a data track, an erase band exists in a region where the magnetic field and field gradient are insufficient to write a well defined transition in the magnetic medium. As track pitch is reduced in order to increase track density, the erase bands become an increasingly significant portion of the track pitch and contribute to track edge noise which degrades the signal output.

The configuration shown in FIG. 10 generates a significantly large fringing field during recording which is caused by flux leakage from the second pole tip portion 79 to the parts of the first pole 72 beyond the region defined by the width W2 of the second pole tip portion 79. The erase bands generated by this configuration have very wide widths and thereby limit the extent to which trackwidths can be narrowed.

A method for limiting erase band widths is shown schematically in FIG. 2B in which a pedestal 39 having the same width as the width W2 of, the second pole tip portion 45 is formed on top of the first pole 32. The shown configuration, called a self-aligned structure, limits the fringing field to the extent that the width of the pedestal 39 is substantially equal to the width W2 of the second pole tip portion 45 and the pedestal 39 and second pole tip portion 45 are aligned. Misalignment can lead to erase bands of unequal widths or an erase band having too great a width.

Of additional importance in high density applications where tracks of information are written closely together is the off-track performance of the magnetic recording system. The off-track performance relates to the ability of the read element to accurately read the information stored in the write tracks and is measured by the offtrack capability (OTC). One approach employed in the prior art to improve the OTC of a magnetic recording system involves using a write element having a wide width and a read element having a comparatively narrow width. In this arrangement the demands placed upon the servo controlling the read element are relaxed as the read element can move from the center of the track before encountering the erase bands.

Another way to increase the OTC of a magnetic recording system is to increase the erase band width which has a practical limit beyond which the OTC fails. A very wide erase band can be a disadvantage when adjacent tracks are written close together as the magnetic write width is decreased. Wide erase bands degrade signal output and increase the onset of edge noise. For narrow magnetic track widths, there exists an optimum erase band width which is dependent upon the characteristics of the servo and which guarantees a minimum error rate.

It would therefore be desirable to provide a write element and a method for fabricating such a write element which optimizes the erase band width of a track given the trackwidth and servo specifications. Such a method would preferably be simple and employ existing processes.

SUMMARY OF THE INVENTION

The present invention provides a shared pole magnetic read/write head for achieving optimized erase band width and a method for fabricating the same. It has been found that there exists a relationship between a quantity delta defined as the difference between the width of the first pole and the width of the second pole and the resultant erase band width. The method of the present invention optimizes the erase band width by adjusting the value of delta and results in a read/write head useful in circumstances where the servo does not require small erase bands such as those resulting from a self-aligned pole structure having equal widths. Additionally, the alignment of the second pole relative to the first pole is not of critical importance in the read/write head of the present invention, the first pole being wider than the second pole.

A first process for forming the read/write head of the present invention includes plating the first pole pedestal having a first width onto a first planarized surface of a wafer having a second MR shield/first pole and an MR interconnect fabricated thereon. A first midcoat layer of insulating material is plated onto the surface of the wafer and planarized to define the thickness of the pedestal and to form a second planarized surface. A write gap layer is formed on top of a second planarized surface. The insulation stack, including the coil layers, is then deposited and the second pole plated to a second width. By adjusting the first width or the difference between the widths of the first and second poles in accordance with the present invention, the erase band width is optimized.

A second alternative process for forming the read/write head of the present invention includes depositing a write gap layer onto a first planarized surface of a wafer having a second MR shield/first pole and an MR interconnect fabricated thereon. The insulation stack including the coil layers is then deposited on top of the write gap layer and the second pole plated on top of the insulating layers. Photoresist is deposited on the write gap layer to define the width of the second pole. The second pole is then ion milled to define the trackwidth of the read/write head and the photoresist stripped from the wafer. The ion milling also forms a pedestal upon the first planarized surface, the width of the pedestal being determined by the angle at which the second pole is milled. Thus, by altering the ion milling angle, both the trackwidth and erase band width can be optimized.

These and other advantages of the present invention will become apparent to those skilled in the art upon a reading of the following descriptions of the invention and a study of the several figures of the drawings.

DETAILED DESCRIPTION OF THE PREFERRED EMBODIMENTS

Figure 1A:
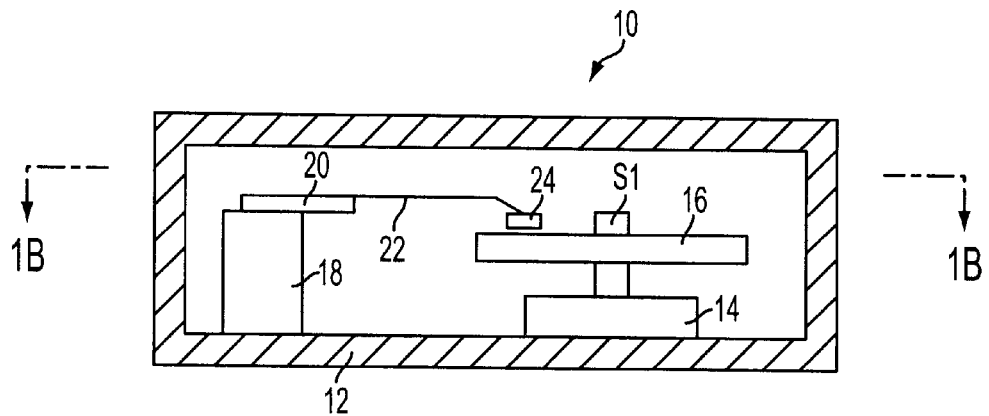
FIG. 1A is a partial cross-sectional front elevation view of a magnetic data storage system.
Figure 1B:
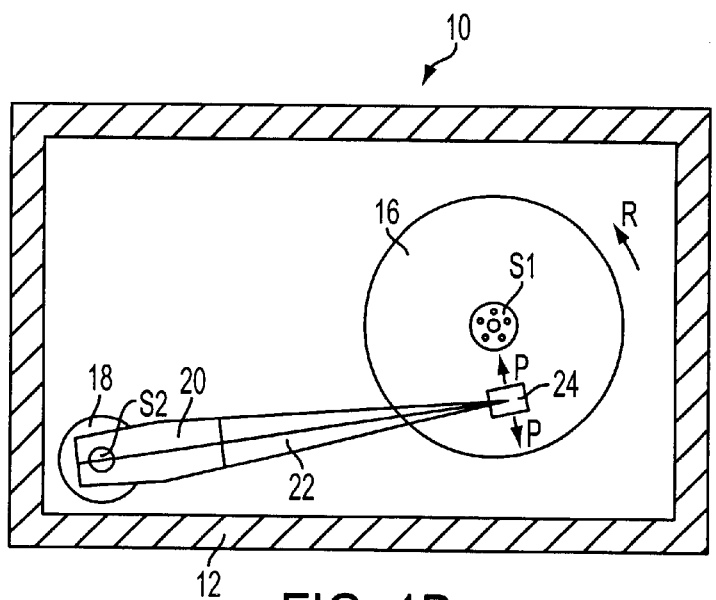
FIG. 1B is a top plan view taken along line 1B—1B of FIG. 1A.
Figure 2A:
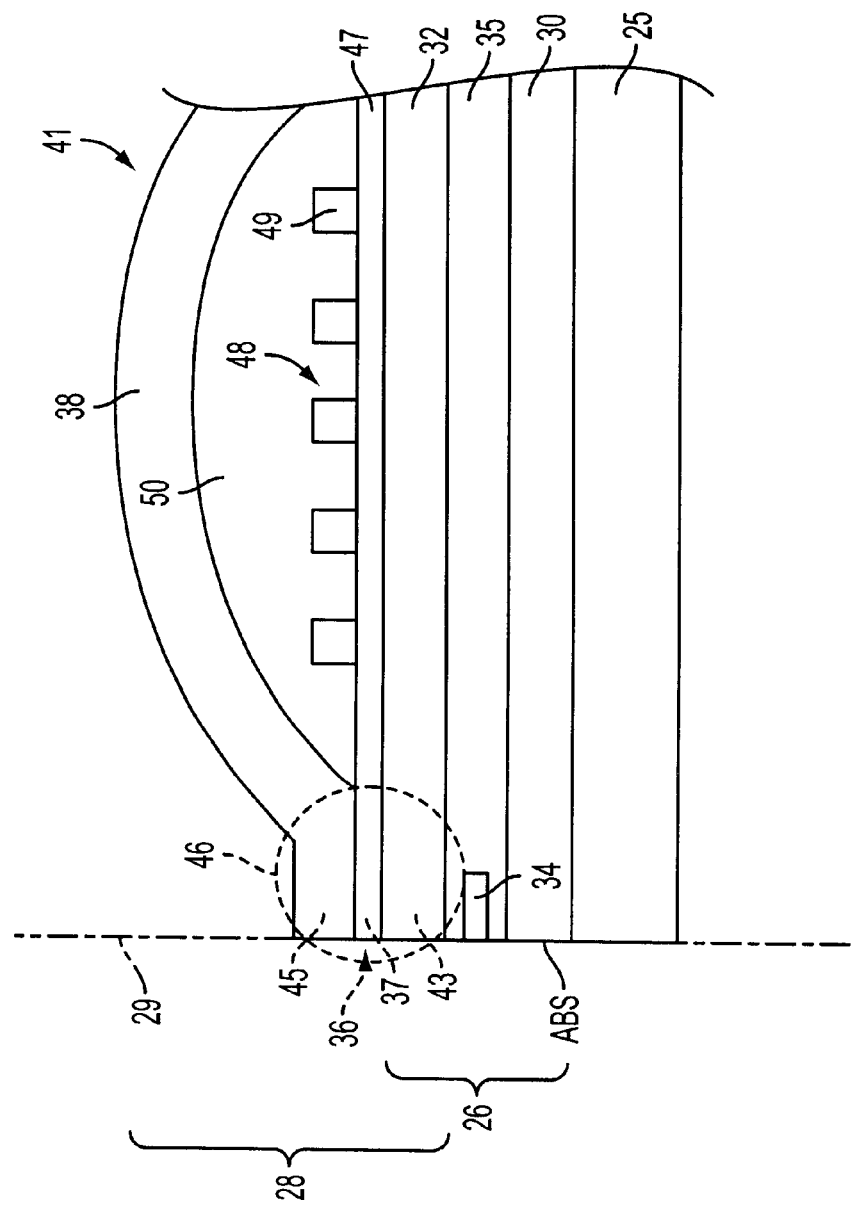
FIG. 2A is a partial cross-sectional view of a prior art read/write head of the magnetic disk drive assembly of FIGS. 1A and 1B.
Figure 2B:
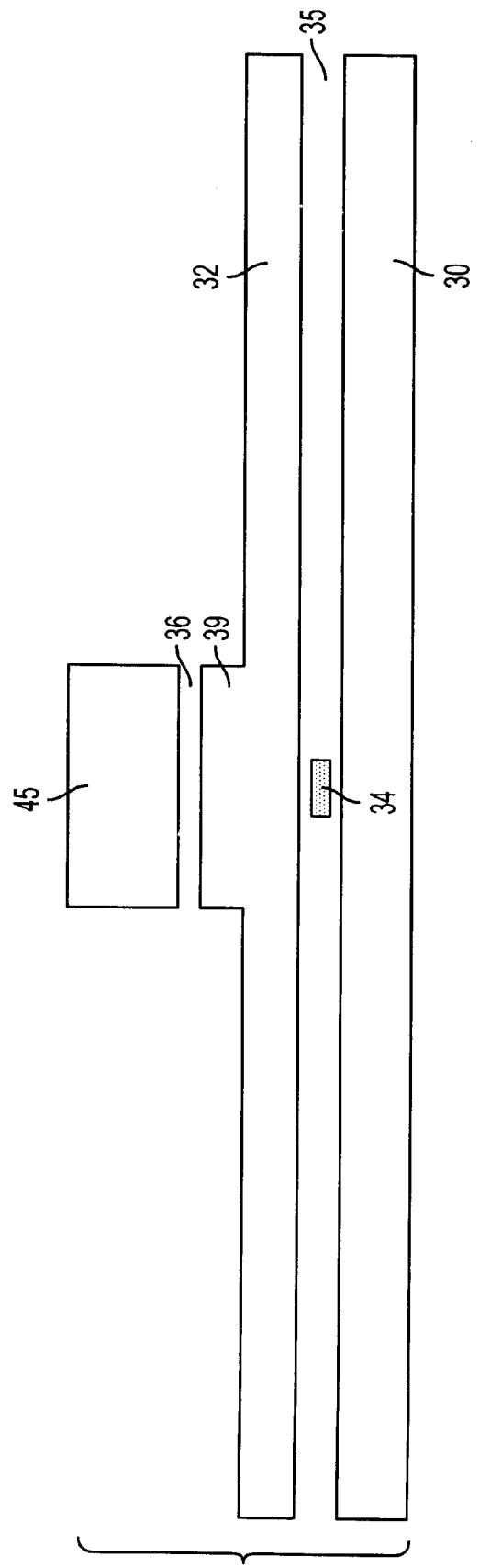
FIG. 2B is an air bearing surface view of a prior art merged read/write head.
Figure 3:
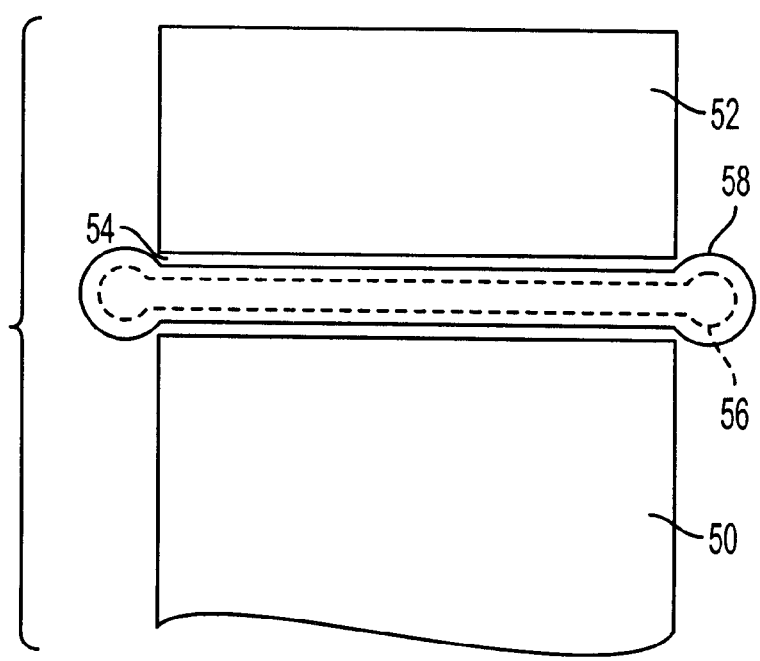
FIG. 3 is a partial air bearing surface view of a prior art merged read/write head showing the flux lines between the first pole and the second pole.
Figure 4:
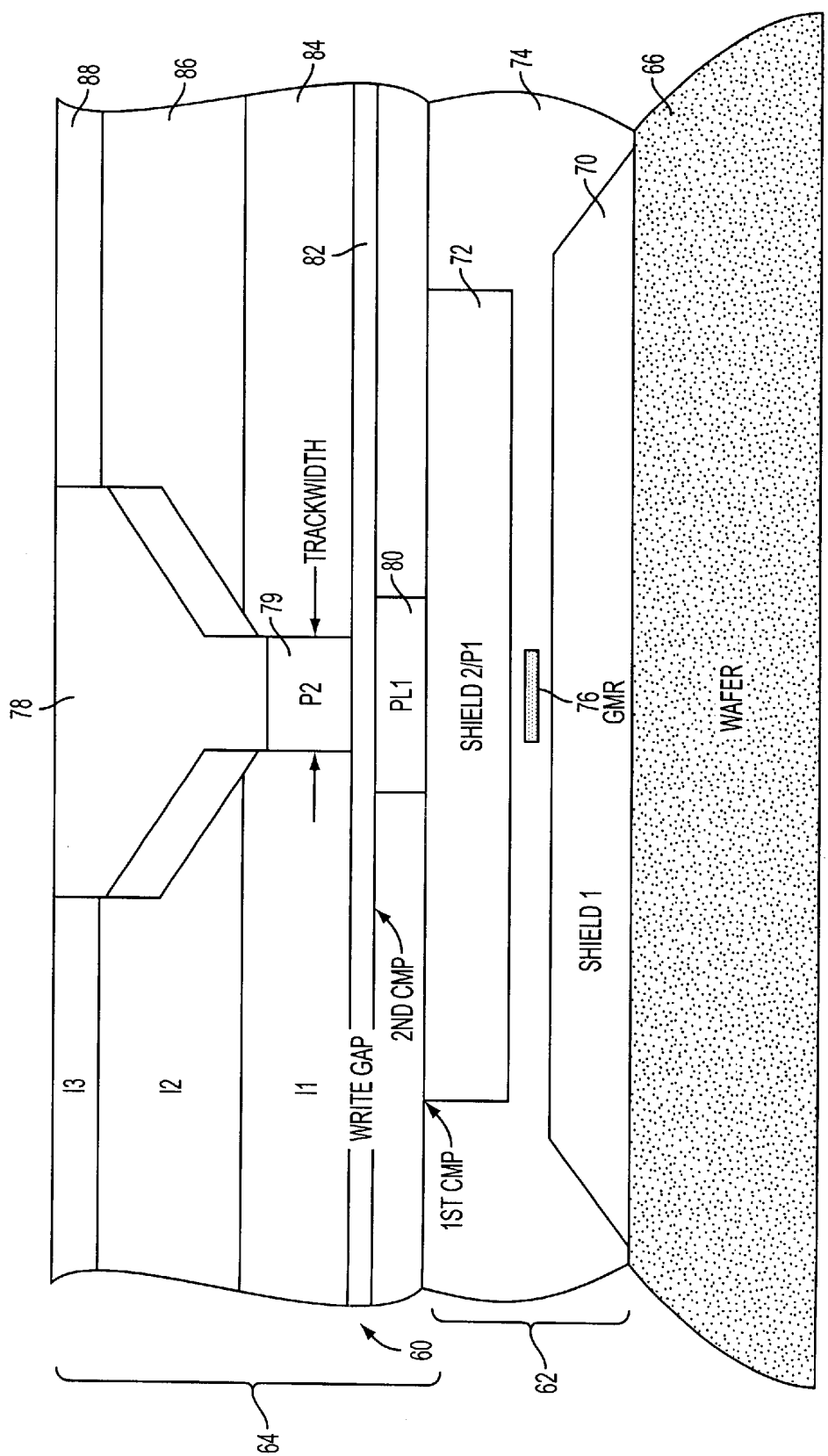
FIG. 4 is an ABS view of the read/write head of the present invention.

With reference to FIG. 4, the present invention is embodied in a merged read/write head 60 including a read element 62 and a write element 64 that are fabricated upon a substrate 66. The read element 62 includes first and second shields 70 and 72, separated by a first dielectric layer 74. A magnetoresistive read sensor 76 is embedded within the dielectric layer 74.

The write element 64 includes a first pole comprising the second shield 72 and a second pole 78. A pedestal 80 is fabricated upon the second shield/first pole 72 as further described hereinafter. A gap layer 82 separates a tip portion 79 of the second pole 78 from the pedestal 80 at an air bearing surface. An insulation stack includes insulation layers 84, 86, and 88 through which may be disposed coil layers in the manner well know in the art.

Figure 5:
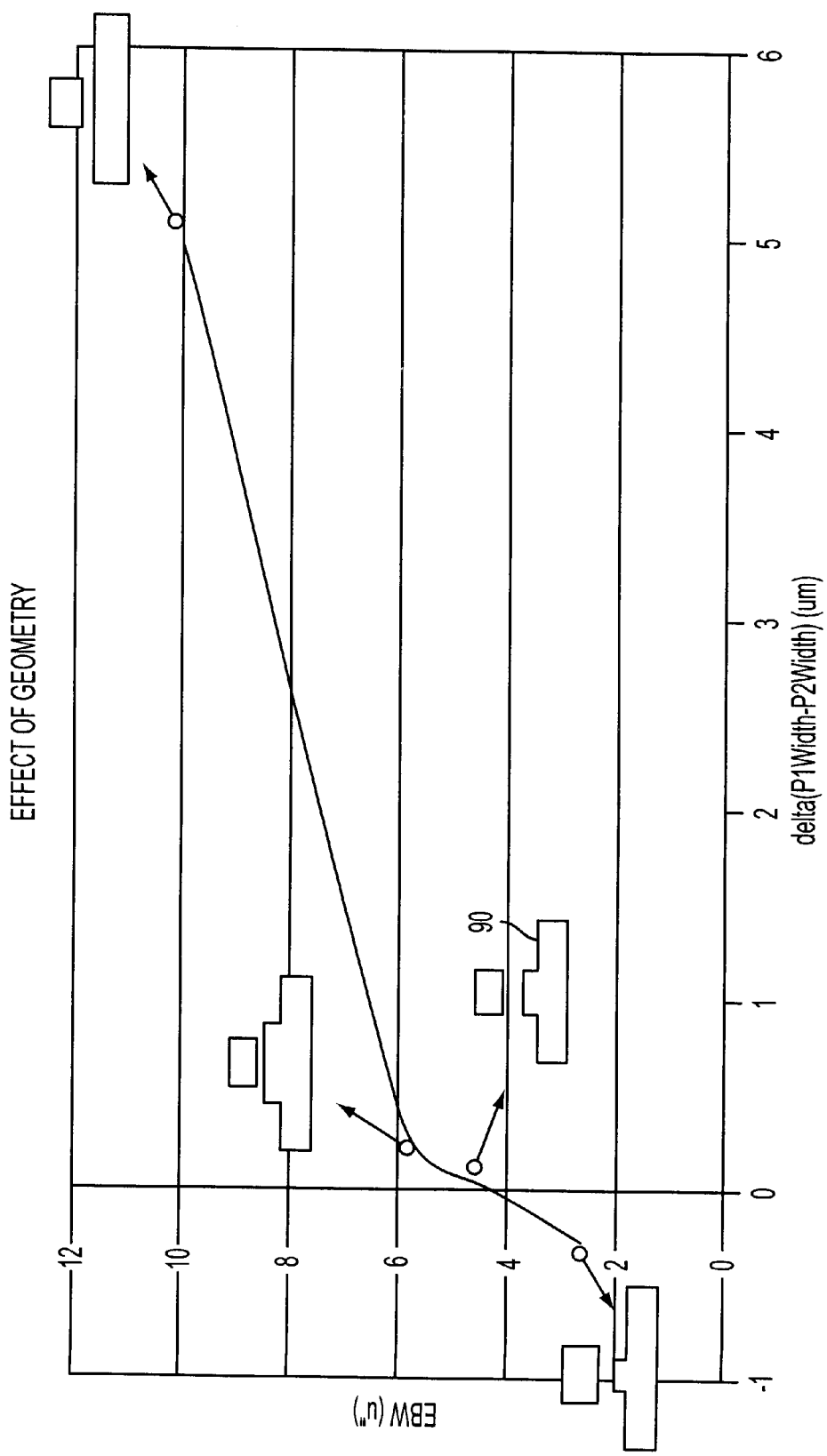
FIG. 5 is a graph showing the relationship between the width of the first pole relative to the width of the second pole and the width of the erase band.
Figure 6:
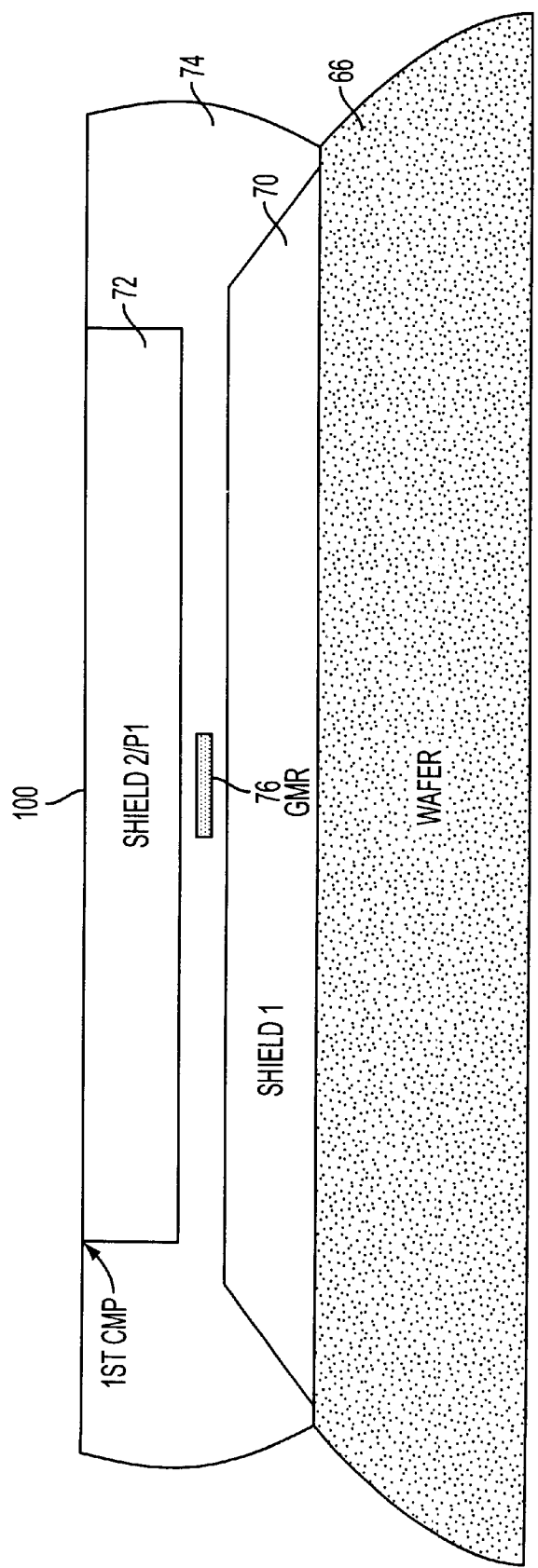
FIGS. 6–9 are ABS views of a read/write head of the present invention in progressive intermediate stages of development using the first process.
Figure 7:
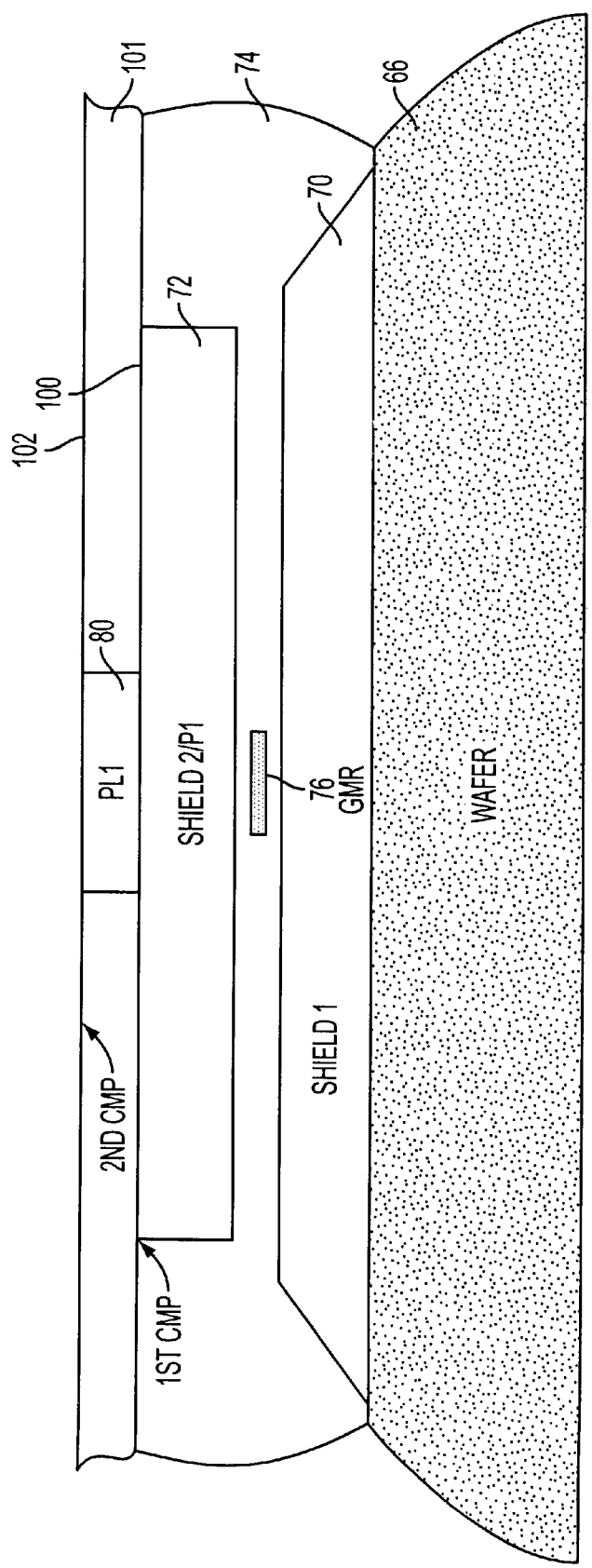
Figure 8:
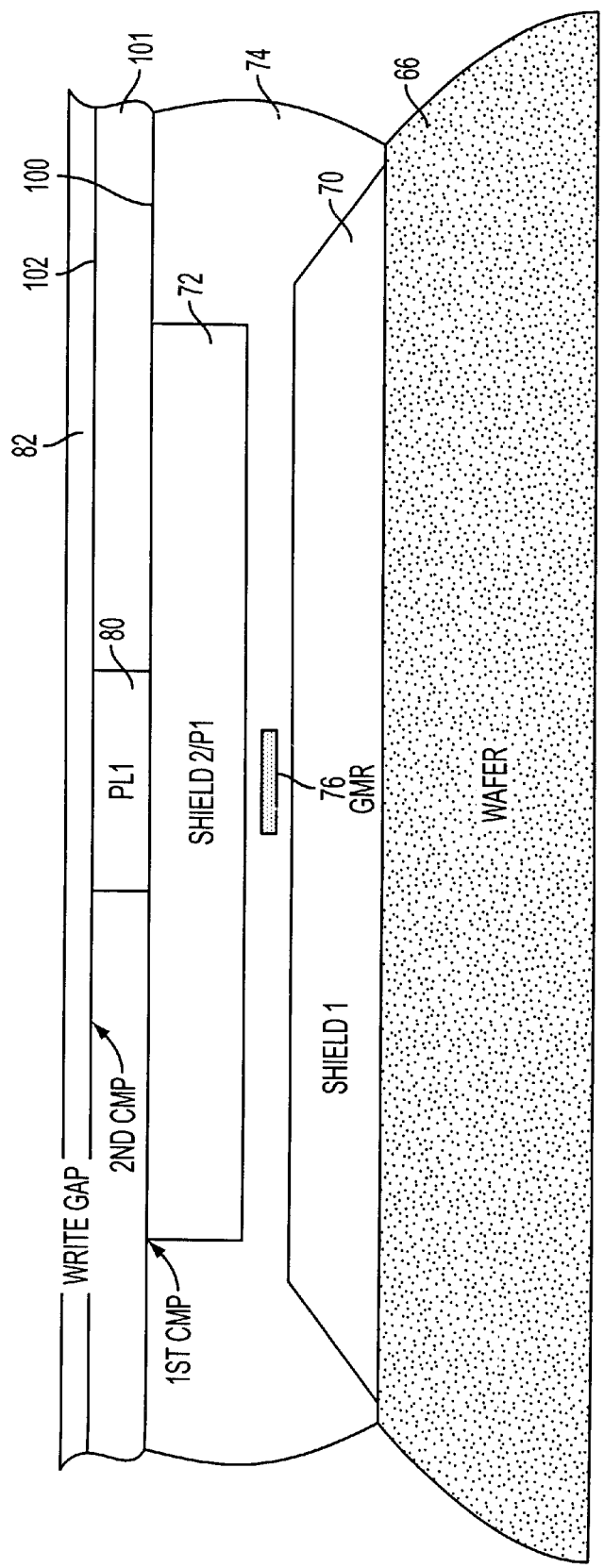
Figure 9:
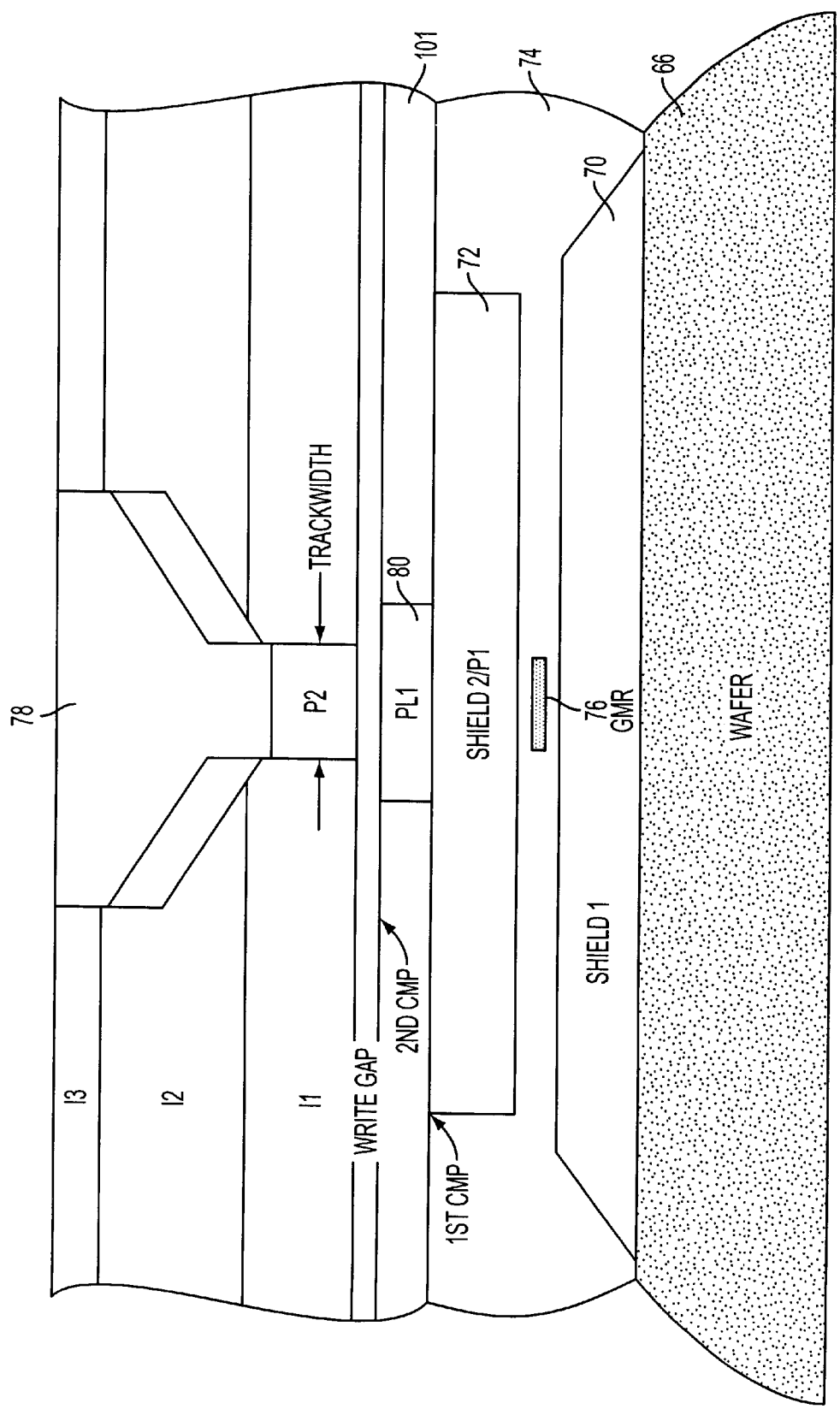
Figure 10:
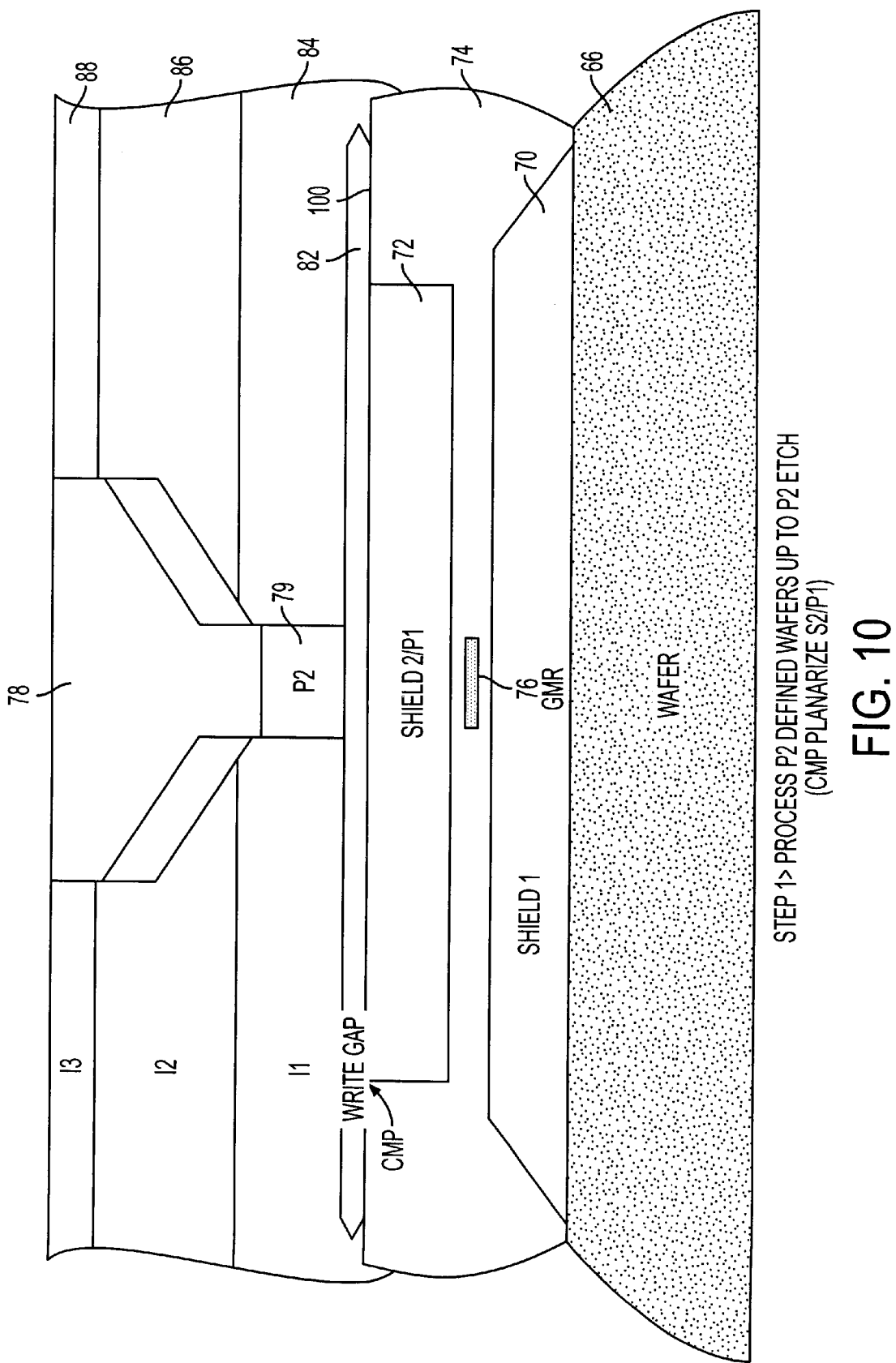
FIGS. 10–13 are ABS views of a read/write head of the present invention in progressive intermediate stages of development using the second alternative process.
Figure 11:
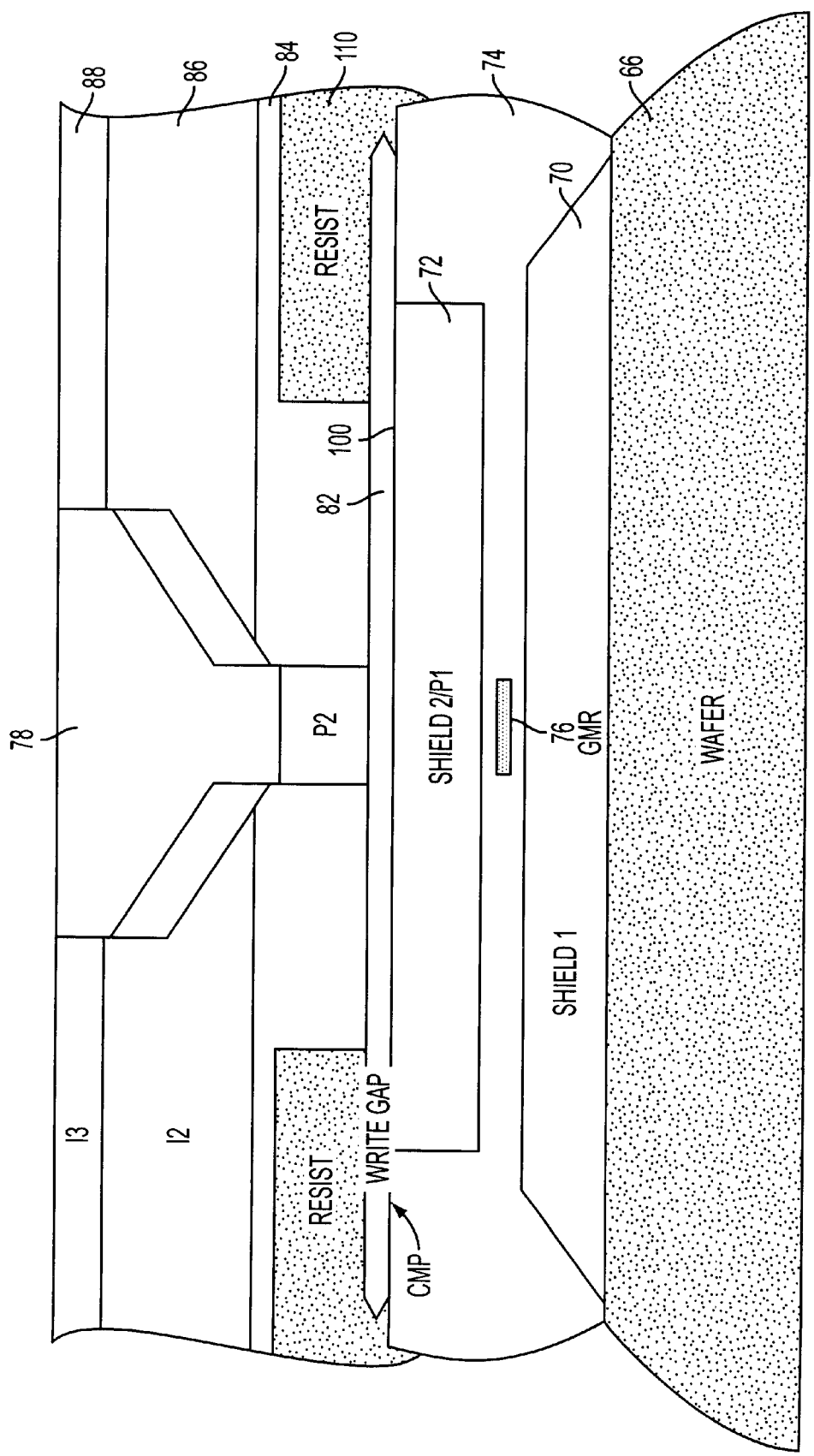
Figure 12:
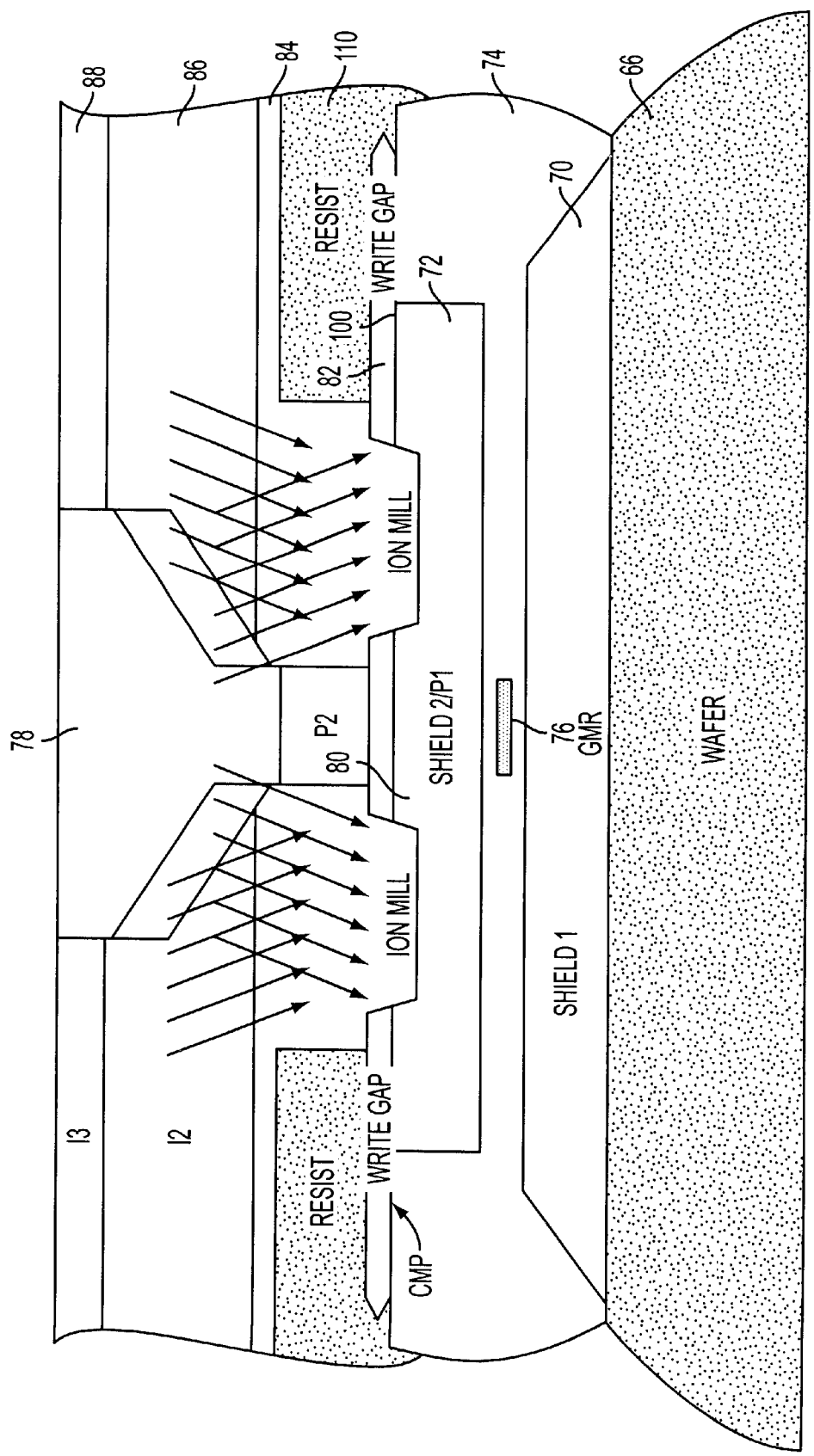
Figure 13:
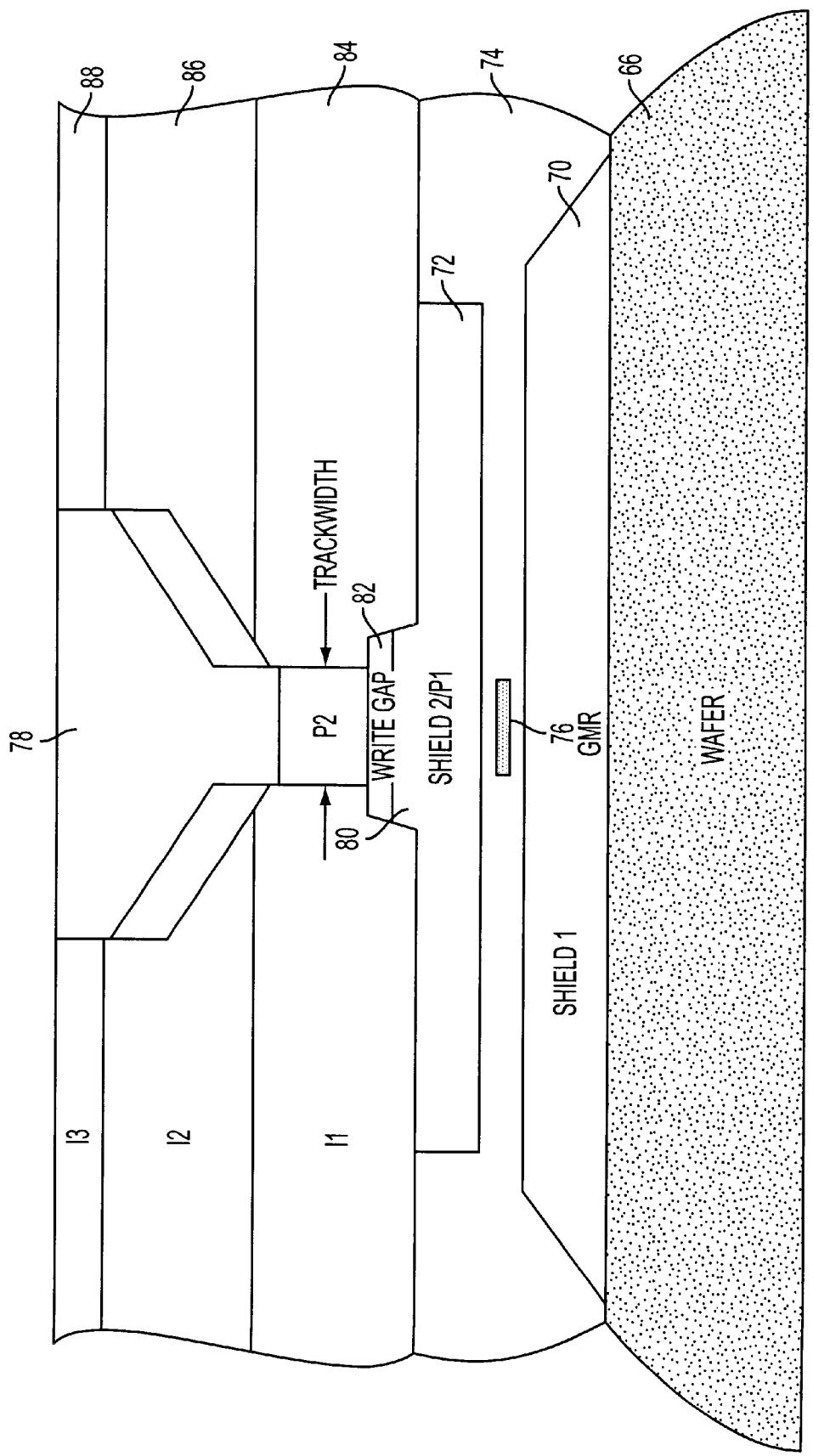

The inventors of the present invention have discovered that there exists a relationship between a quantity delta corresponding to the difference between the width of the pedestal 80 and the width of the second pole tip portion 79 and the erase band width of the read/write head 60. This relationship is shown graphically in FIG. 5. As shown, a self aligned structure 90 corresponds to an erase band width of about 4.4 micro inches. For wider first pole pedestal configurations relative to the width of the second pole the erase band width is correspondingly wider reaching it's widest width when the first pole is infinitely wide relative to the second pole (the case where no pedestal is formed on the second shield/first pole 72). As seen from the graph, the erase band width can be optimized by defining the quantity delta. So long as a self-aligned structure is not required by servo constraints, the process of the present invention easily tunes the erase band width by adjusting the value of the quantity delta.

A first process for forming the read/write head of the present invention is schematically shown in FIGS. 6 through 9 and includes forming a first planarized surface 100 on a wafer having a second MR shield/first pole and an MR interconnect fabricated thereon. The surface 100 is preferably formed by a chemical/mechanical polishing process. To the first planarized surface 100 a first pole pedestal 80 having a first width is plated. A first midcoat layer of insulating material 101 such as alumina is plated onto the surface of the wafer and planarized to define the thickness of the pedestal 80 and planarized to form a second planarized surface 102. A write gap layer 82 is formed on top of the second planarized surface 102. The insulation stack including insulation layers 84, 86, and 88 which include the coil layers (not shown) is then deposited and the second pole 78 is plated to a second width. By adjusting the second width relative to the first width in accordance with the present invention, the erase band width is optimized.

A second alternative process for forming the read/write head of the present invention is shown schematically in FIGS. 10 through 13 and includes depositing a write gap layer 82 onto a first planarized surface 100 of a wafer having a second MR shield/first pole and an MR interconnect fabricated thereon. The insulation stack including insulating layers 84, 86, and 88 which include the coil layers is then deposited on top of the write gap layer 82 and the second pole 78 plated on top of the insulating layers. Photoresist 110 is deposited on the write gap layer 82 to define the width of the second pole 78 at the air bearing surface. The second pole 78 is then ion milled to define the trackwidth of the write head and the photoresist 110 stripped from the wafer. The ion milling also forms a pedestal 80 upon the first planarized surface 100, the width of the pedestal 80 being determined by the angle at which the second pole 78 is milled. Thus, by altering the ion milling angle, both the trackwidth and erase band width can be optimized.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

What is claimed is:

1. An inductive write head comprising:

a write gap layer including a write gap top surface and a write gap bottom surface;

a first pole including a first pole pedestal having
 a rectangular surface forming part of an air bearing surface, and
 a first pole pedestal top surface in contact with the write gap bottom surface along a first interface having a first width measured at the air bearing surface;

a second pole including a second pole tip portion having a second pole tip portion bottom surface in contact with the write gap top surface along a second interface having a second width measured at the air bearing surface, the second width being less than the first width.

2. The inductive write head of claim 1 wherein a difference between the first and second widths is between 0.3 micrometers and 0.4 micrometers.

* * * * *